(12) United States Patent
Dor et al.

(10) Patent No.: US 12,739,300 B2
(45) Date of Patent: Sep. 15, 2026

(54) NETWORK SET GENERATION FOR A DATA STORAGE SYSTEM BASED ON NETWORK TOPOLOGY DEPENDENCIES

(71) Applicant: Dell Products L.P., Round Rock, TX (US)

(72) Inventors: Ziv Dor, Rishon Letzion (IL); Rivka Mayraz Matosevich, Zichron Ya'acov (IL); Igal Moshkovich, Even Yehuda (IL); Avner Gidron, Yokneam Illit (IL); Sara Dakwar, Fassuta (IL)

(73) Assignee: Dell Products L.P., Round Rock, TX (US)

( * ) Notice: Subject to any disclaimer, the term of this patent is extended or adjusted under 35 U.S.C. 154(b) by 295 days.

(21) Appl. No.: 18/521,742

(22) Filed: Nov. 28, 2023

(65) Prior Publication Data

US 2025/0175525 A1 May 29, 2025

(51) Int. Cl.
*H04L 67/1097* (2022.01)
*H04L 67/1042* (2022.01)

(52) U.S. Cl.
CPC ...... *H04L 67/1097* (2013.01); *H04L 67/1042* (2013.01)

(58) Field of Classification Search
CPC ........................ H04L 67/1097; H04L 67/1042
See application file for complete search history.

(56) References Cited

U.S. PATENT DOCUMENTS 7,805,566 B2 9/2010 Abouelwafa et al.
10,992,532 B1 * 4/2021 Smith ................. H04L 67/1097
11,461,031 B1 10/2022 Moran et al.
11,550,734 B1 * 1/2023 Matosevich .......... G06F 13/102
2003/0163592 A1 8/2003 Odenwald
2007/0239954 A1 10/2007 Sakashita et al.
2013/0212345 A1 8/2013 Nakajima
2018/0181328 A1 * 6/2018 Espeseth ............... G06F 9/5083
2023/0342037 A1 * 10/2023 Sahin .................... G06F 3/0659
2023/0342059 A1 10/2023 Mayraz Matosevich et al.

OTHER PUBLICATIONS

NVM Express, NVM Express, Revision 1.3, NVM Express, May 1, 2017, 282 pages.

(Continued)

*Primary Examiner* — Vivek Srivastava
(74) *Attorney, Agent, or Firm* — Ryan, Mason & Lewis, LLP

(57) ABSTRACT

An apparatus comprises at least one processing device configured to identify a plurality of networks providing connections to a data storage system, to determine network topology dependencies associated with resources shared by different ones of the networks, and to generate network sets including first and second network sets comprising first and second subsets of the network determined to have first and second sets of network topology dependencies for at least one type of resources. The at least one processing device is further configured to select a given set of networks for at least one client device accessing the data storage system, the given set of networks comprising at least a first network in the first network set and at least a second network in the second network set.

20 Claims, 5 Drawing Sheets

(56) References Cited

OTHER PUBLICATIONS

E. Smith, "Introducing Target Driven Zoning (TDZ)," https://brasstacksblog.typepad.com/brass-tacks/2012/01/introducing-target-driven-zoning-tdz.html, Jan. 16, 2012, 10 pages.
N. Dyer, "NimbleOS 5.2: Simplify Fibre Channel Deployments with Target Driven Zoning (SmartSAN)," https://community.hpe.com/t5/Around-the-Storage-Block/NimbleOS-5-2-Simplify-Fibre-Channel-Deployments-with-Target/ba-p/7090929#.Ydh1DWjMKUk, Jun. 11, 2020, 12 pages.
R. Mohan, "Fibre Channel SAN Automation and Orchestration," https://fibrechannel.org/fibre-channel-san-automation-and-orchestration/, Accessed Sep. 14, 2021, 6 pages.
Dell Technologies, "Dell PowerFlex," Spec Sheet, May 2023, 14 pages.
Dell Technologies, "Dell PowerFlex 4.0.x," Technical Overview, May 2023, 64 pages.
U.S. Appl. No. 18/090,792 filed in the name of Christopher Trudel et al. on Dec. 29, 2022, and entitled "Cluster Management in Large-Scale Storage Systems.".

* cited by examiner

NETWORK SET GENERATION FOR A DATA STORAGE SYSTEM BASED ON NETWORK TOPOLOGY DEPENDENCIES

BACKGROUND

Information processing systems often include distributed arrangements of multiple nodes, also referred to herein as distributed processing systems. Such systems can include, for example, distributed storage systems comprising multiple storage nodes. These distributed storage systems are often dynamically reconfigurable under software control in order to adapt the number and type of storage nodes and the corresponding system storage capacity as needed, in an arrangement commonly referred to as a software-defined storage system. For example, in a typical software-defined storage system, storage capacities of multiple distributed storage nodes are pooled together into one or more storage pools. Data within the system is partitioned, striped, and replicated across the distributed storage nodes. For a storage administrator, the software-defined storage system provides a logical view of a given dynamic storage pool that can be expanded or contracted at ease, with simplicity, flexibility, and different performance characteristics. For applications running on a host device that utilizes the software-defined storage system, such a storage system provides a logical storage object view to allow a given application to store and access data, without the application being aware that the data is being dynamically distributed among different storage nodes potentially at different sites.

SUMMARY

Illustrative embodiments of the present disclosure provide techniques for generation of network sets for a data storage system based on network topology dependencies for networks providing connections to the data storage system.

In one embodiment, an apparatus comprises at least one processing device comprising a processor coupled to a memory. The at least one processing device is configured to identify a plurality of networks providing connections to a data storage system and to determine network topology dependencies between the plurality of networks, the dependencies being associated with one or more types of resources shared by different ones of the plurality of networks. The at least one processing device is also configured to generate two or more network sets, a first one of the two or more network sets comprising a first subset of the plurality of networks determined to have a first set of network topology dependencies with one another for at least one of the one or more types of resources, a second one of the two or more network sets comprising a second subset of the plurality of networks determined to have a second set of network topology dependencies with one another for said at least one of the one or more types of resources. The at least one processing device is further configured to select a given set of networks for at least one client device accessing the data storage system, the given set of networks comprising at least a first network in the first network set and at least a second network in the second network set.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
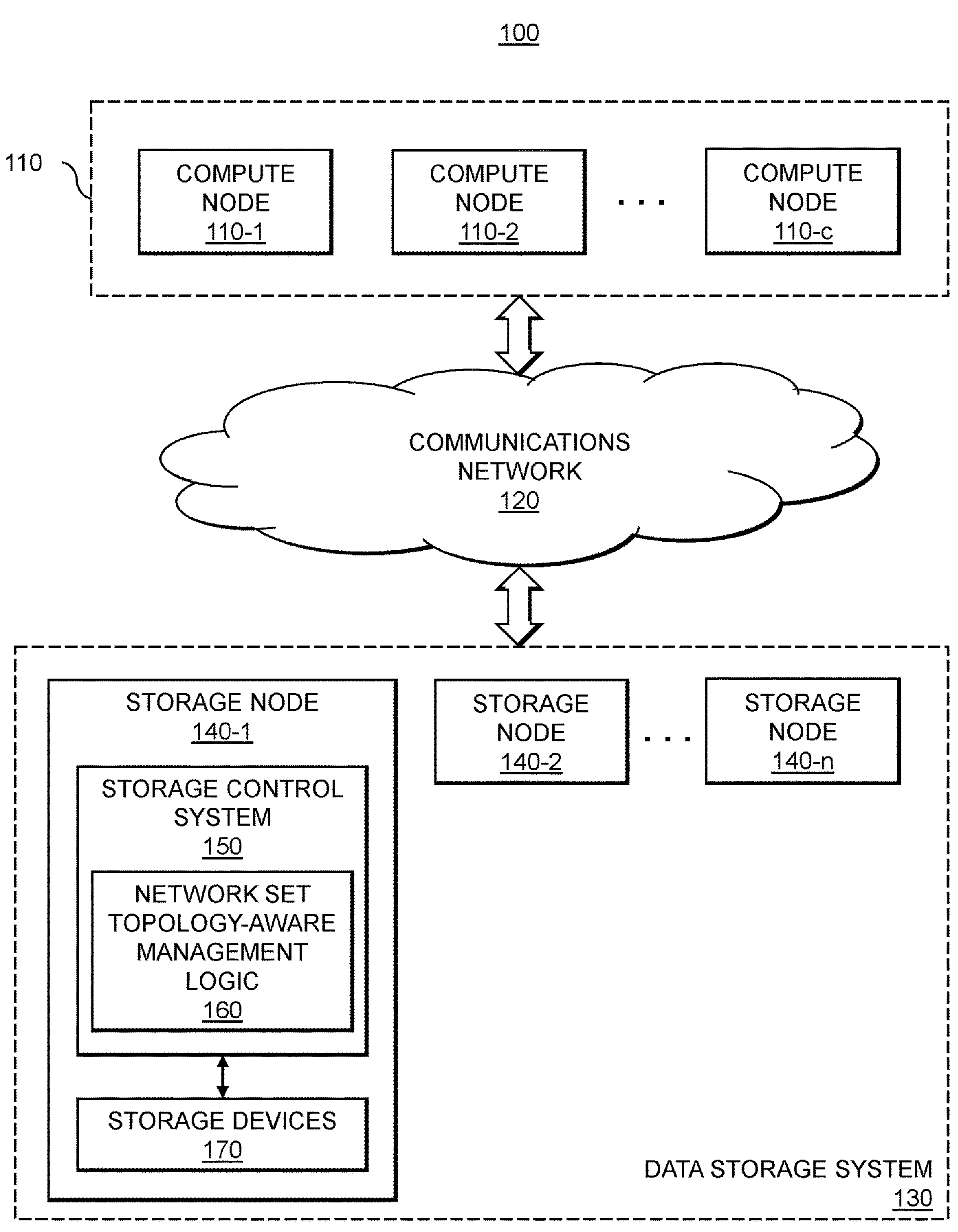
FIG. 1 is a block diagram of an information processing system configured for generation of network sets for a data storage system based on network topology dependencies for networks providing connections to the data storage system in an illustrative embodiment.

FIG. 1 schematically illustrates an information processing system configured to implement functionality for generation of network sets for a data storage system based on network topology dependencies for networks providing connections to the data storage system. More specifically, FIG. 1 schematically illustrates an information processing system 100 which comprises a plurality of compute nodes 110-1, 110-2, . . . , 110-*c* (collectively referred to as compute nodes 110), a communications network 120, and a data storage system 130. The data storage system 130 comprises a plurality of storage nodes 140-1, 140-2, . . . , 140-*n* (collectively referred to as storage nodes 140, or each singularly referred to as storage node 140). The storage nodes 140 may comprise, for example, server nodes or other types of storage nodes.

The compute nodes 110 illustratively comprise physical compute nodes and/or virtual compute nodes which process data and execute workloads. For example, the compute nodes 110 can include one or more servers (e.g., bare metal servers) and/or one or more virtual machines. In some embodiments, the compute nodes 110 comprise a cluster of physical servers or other types of computers of an enterprise computer system, cloud-based computing system or other arrangement of multiple compute nodes associated with respective users. In some embodiments, the compute nodes 110 include a cluster of virtual machines that execute on one or more physical servers.

The compute nodes 110 are configured to process data and execute tasks/workloads and perform computational work, either individually, or in a distributed manner, to thereby provide compute services such as execution of one or more applications on behalf of each of one or more users associated with respective ones of the compute nodes. Such applications illustratively issue input-output (IO) requests that are processed by a corresponding one of the storage nodes 140. The term "input-output" as used herein refers to at least one of input and output. For example, IO requests may comprise write requests and/or read requests directed to stored data of a given one of the storage nodes 140 of the data storage system 130.

The compute nodes 110 are configured to write data to and read data from the storage nodes 140 in accordance with applications executing on those compute nodes for system users. The compute nodes 110 communicate with the storage nodes 140 over the communications network 120. While the communications network 120 is generically depicted in FIG. 1, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., Ethernet storage network), or various portions or combinations of these and other types of networks.

In this regard, the term "network" as used herein is therefore intended to be broadly construed so as to encompass a wide variety of different network arrangements, including combinations of multiple networks possibly of different types, which enable communication using, e.g., Transfer Control/Internet Protocol (TCP/IP) or other communication protocols such as Fibre Channel (FC), FC over Ethernet (FCOE), Internet Small Computer System Interface (iSCSI), Peripheral Component Interconnect express (PCIe), InfiniBand, Gigabit Ethernet, etc., to implement I/O channels and support storage network connectivity. Numerous alternative networking arrangements are possible in a given embodiment, as will be appreciated by those skilled in the art.

The data storage system 130 may comprise any type of data storage system, or a combination of data storage systems, including, but not limited to, a storage area network (SAN) system, a network attached storage (NAS) system, a direct-attached storage (DAS) system, etc., as well as other types of data storage systems comprising software-defined storage, clustered or distributed virtual and/or physical infrastructure. The term "data storage system" as used herein should be broadly constructed and not viewed as being limited to storage systems of any particular type or types. In some embodiments, the storage nodes 140 comprise one or more processing devices each having a processor and a memory, possibly implementing virtual machines and/or containers, although numerous other configurations are possible. In some embodiments, one or more of the storage nodes 140 can additionally implement functionality of a compute node, and vice-versa. The term "storage node" as used herein is therefore intended to be broadly construed, and a storage system in some embodiments can be implemented using a combination of storage nodes and compute nodes.

As shown in FIG. 1, the storage node 140-1 comprises a storage control system 150 and one or more storage devices 170. The storage node 140-1 may be a physical server or storage appliance, wherein the storage devices 170 comprise DAS resources (internal and/or external storage resources) such as hard-disk drives (HDDs), solid-state drives (SSDs), Flash memory cards, or other types of non-volatile memory (NVM) devices such non-volatile random access memory (NVRAM), phase-change RAM (PC-RAM) and magnetic RAM (MRAM). These and various combinations of multiple different types of storage devices 170 may be implemented in the storage node 140-1. In this regard, the term "storage device" as used herein is intended to be broadly construed, so as to encompass, for example, SSDs, HDDs, flash drives, hybrid drives or other types of storage media. The storage devices 170 are connected to the storage node 140-1 through any suitable host interface, e.g., a host bus adapter, using suitable protocols such as ATA, SATA, CSATA, NVMe, SCSI, SAS, etc. In other embodiments, the storage node 140-1 can be network connected to one or more NAS nodes over a local area network.

The storage control system 150 is configured to manage the storage devices 170 and control I/O access to the storage devices 170 and/or other storage resources (e.g., DAS or NAS resources) that are directly attached or network-connected to the storage node 140. In some embodiments, the storage control system 150 is a component (e.g., storage data server) of a software-defined storage (SDS) system which supports the virtualization of the storage devices 170 by separating the control and management software from the hardware architecture. More specifically, in a software-defined storage environment, the storage control system 150 comprises an SDS storage data server that is configured to abstract storage access services from the underlying storage hardware to thereby control and manage I/O requests issued by the compute nodes 110, as well as to support networking and connectivity. In this instance, the storage control system 150 comprises a software layer that is hosted by the storage node 140-1 and deployed in the data path between the compute nodes 110 and the storage devices 170 of the storage node 140-1, and is configured to respond to data I/O requests from the compute nodes 110 by accessing the storage devices 170 to store/retrieve data to/from the storage devices 170 based on the I/O requests.

In a software-defined storage environment, the storage control system 150 is configured to provision, orchestrate and manage the local storage resources (e.g., the storage devices 170) of the storage node 140-1. For example, the storage control system 150 implements methods that are configured to create and manage storage pools (e.g., virtual pools of block storage) by aggregating capacity from the storage devices 170. The storage control system 150 can divide a storage pool into one or more volumes and expose the volumes to the compute nodes 110 as virtual block devices. For example, a virtual block device can correspond to a volume of a storage pool. Each virtual block device comprises any number of actual physical storage devices, wherein each block device is preferably homogenous in terms of the type of storage devices that make up the block device (e.g., a block device can include only HDD devices or SSD devices, etc.).

In the software-defined storage environment, each of the storage nodes 140 in FIG. 1 can run an instance of the storage control system 150 to convert the respective local storage resources (e.g., DAS storage devices and/or NAS storage devices) of the storage nodes 140 into local block storage. Each instance of the storage control system 150 contributes some or all of its local block storage (HDDs, SSDs, PCIe, NVMe and flash cards) to an aggregated pool of storage of a storage node cluster (e.g., cluster of storage nodes 140) to implement a server-based storage area network (SAN) (e.g., virtual SAN). In this configuration, each storage node 140 is part of a loosely coupled server cluster which enables "scale-out" of the software-defined storage environment, wherein each instance of the storage control system 150 that runs on a respective one of the storage nodes

140 contributes its local storage space to an aggregated virtual pool of block storage with varying performance tiers (e.g., HDD, SSD, etc.) within a virtual SAN.

The SDS metadata manager components are deployed on multiple servers and operate in a manner which forms a tightly coupled cluster that is configured to supervise the operations of the storage cluster and manage storage cluster configurations. The SDS metadata managers operate outside of the data path and provide the relevant information to the SDS clients and storage servers to allow such components to control data path operations. The SDS metadata managers are configured to manage the mapping of SDC data clients to the SDS data storage servers. The SDS metadata managers manage various types of metadata that is required for system operation of the SDS environment such as configuration changes, managing the SDS data clients and data servers, device mapping, values, snapshots, system capacity including device allocations and/or release of capacity, RAID protection, errors and failures, and system rebuild tasks including rebalancing.

Regardless of the specific implementation of the storage environment, as noted above, the storage control system 150 may provide data storage and management functionality configured to, e.g., (i) divide the storage capacity of the storage devices 170 into storage pools and logical volumes, and (ii) organize and manage storage of data in the storage pools and logical volumes. In particular, a suitable logical volume management (LVM) system may be implemented which is configured to create and manage local storage volumes by aggregating the storage devices 170 into one or more virtual storage pools that are thin-provisioned for maximum capacity, and logically dividing each storage pool into one or more storage volumes that are exposed as block devices (e.g., raw logical unit numbers (LUNs)) to the compute nodes 110 to store data.

In some embodiments, the storage pools are utilized to group storage devices based on device types and performance. For example, SSDs are grouped into SSD pools, and HDDs are grouped into HDD pools. Furthermore, in some embodiments, the storage control system 150 implements methods to support various data storage management services such as data protection, data migration, data deduplication, data compression, replication, thin provisioning, snapshots, data backups, etc.

As shown in FIG. 1, the storage control system 150 implements network set topology-aware management logic 160. The network set topology-aware management logic 160 is configured to manage the grouping of networks (e.g., Internet Protocol (IP) network subnets) into "network sets," where networks which are part of the same network set are assumed to have some underlying relationship with one another which can affect decisions related to, for example, load balancing, zoning, etc. For example, networks which may fail together under certain circumstances may be made part of the same network set. To ensure high availability connection to the data storage system 130, the storage control system 150 can utilize the network set topology-aware management logic 160 to ensure that clients such as compute nodes 110 establish connections with the data storage system 130 or, more specifically, to the storage node 140-1 thereof, via at least two networks within the communications network 120 which are part of distinct network sets. Network set grouping may be based on any desired characteristics of networks which indicate that multiple networks have a dependency on the same underlying resources. For example, a network set may include multiple networks which have the same physical connectivity to the storage node 140-1 (e.g., a same network switch or other physical network resources), the same virtualization (e.g., which relies on the same underlying virtualization infrastructure or physical infrastructure supporting the virtualization infrastructure), which are on a same power supply (e.g., which, if disrupted, would result in all networks on that power supply losing connectivity to the storage node 140-1), etc.

IP-based networking is extremely efficient in establishing and maintaining endpoint connections on complex network topologies. To do so, IP-based networking may distribute "topology awareness" among switches in the network. However, this makes discovering and even describing complex network topologies a challenge to perform in an automated manner. Further, some networks employ techniques that consider network topology discovery a security risk and can block requests or other communications involved in automatic discovery of the network topology of a communication network.

Complex systems can sometimes require network topology information to make intelligent decisions regarding load balancing (e.g., to maintain resilience and/or performance) and zoning (e.g., to make sure that clients can access server resources only on allowed/expected network ports). In some approaches, IP network topologies are described by grouping endpoints (e.g., ports) by network identifier (ID) (e.g., also referred to as an IP subnet), where the IP address prefix is common to all endpoints which share the same switch (e.g., this is a given as to how IP addressing is designed). To achieve resilience, a node may have several ports (e.g., endpoints) in different networks (e.g., different IP subnets). Conventional approaches suffer from various technical challenges, including in that simple approaches do not allow for describing complex network topologies. Clients and servers that are grouped by network IDs (e.g., IP subnets) are effectively considering only the leaf connection in the connectivity graph, without accounting for the connecting topology between endpoints.

Illustrative embodiments provide technical solutions which are able to enhance a system's network identification by adding an attribute to each network that marks it as belonging to a "network set." By default, each network is a self-contained network set, but several networks can be joined together into a network set to indicate that they are sharing some underlying resource that is not self-evident from the configuration. This allows a system to make better-informed choices for load balancing, zoning, etc.

Figure 2:
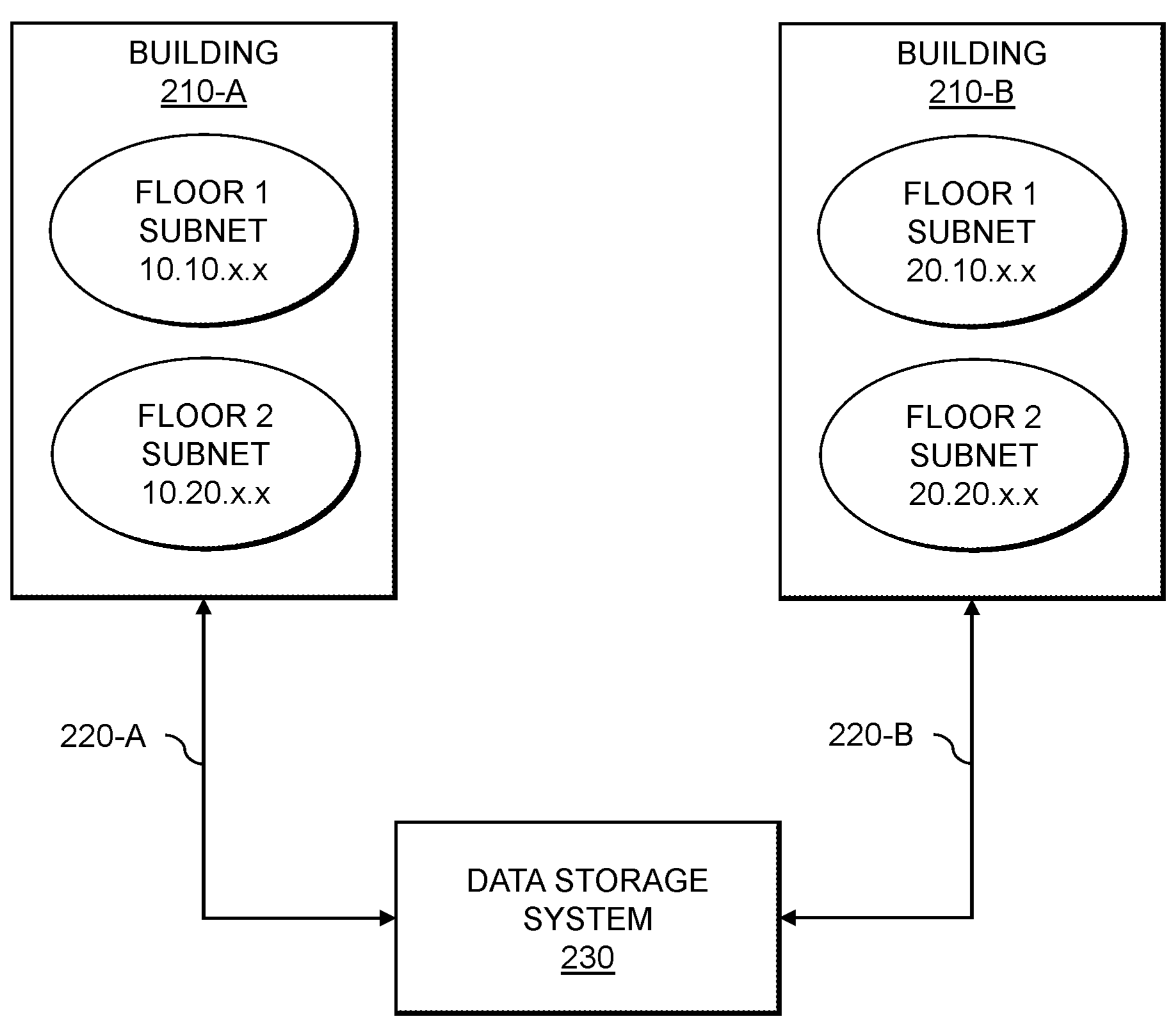
FIG. 2 shows a system configuration of multiple networks providing connectivity to a data storage system in an illustrative embodiment.

Consider, for example, the system 200 shown in FIG. 2, which includes a data storage system 230 which is connected to clients in two different buildings, building 210-A and building 210-B (collective, buildings 210). In each of the buildings 210, there is a different network for each floor. In the example of FIG. 2, it is assumed that each of the buildings 210 has two floors and two networks (e.g., one for each floor). It should be appreciated, however, that this is just an example. A building may include more than two floors, a given floor within a building may include multiple different networks, a particular network may span multiple floors within a building, etc. In the FIG. 2 example, the building 210-A has a first floor with a first network having a subnet 10.10.x.x and a second floor with a second network having a subnet 10.20.x.x. The building 210-B has a first floor with a first network having a subnet 20.10.x.x and a second floor with a second network having a subnet 20.20.x.x. Each of the buildings 210, however, is connected to the data storage system 230 using the same infrastructure 220-A and 220-B. If the building 210-A loses connectivity to the data storage system 230, its first network for the first floor with the subnet 10.10.x.x and its second network for the second floor with the subnet 10.20.x.x will "fail together." Similarly, if the building 210-B loses connectivity to the data storage system 230, its first network for the first floor with the subnet 20.10.x.x and its second network for the second floor with the subnet 20.20.x.x will "fail together." Thus, in the context of the data storage system 230, the two networks in each of the buildings 210 fail together and should be considered as part of the same network set. Thus, a first network set for building 210-A would include the first network first network for the first floor with the subnet 10.10.x.x and the second network for the second floor with the subnet 10.20.x.x, and a second network set for the building 210-B would include the first network for the first floor with the subnet 20.10.x.x and the second network for the second floor with the subnet 20.20.x.x.

Figure 3:
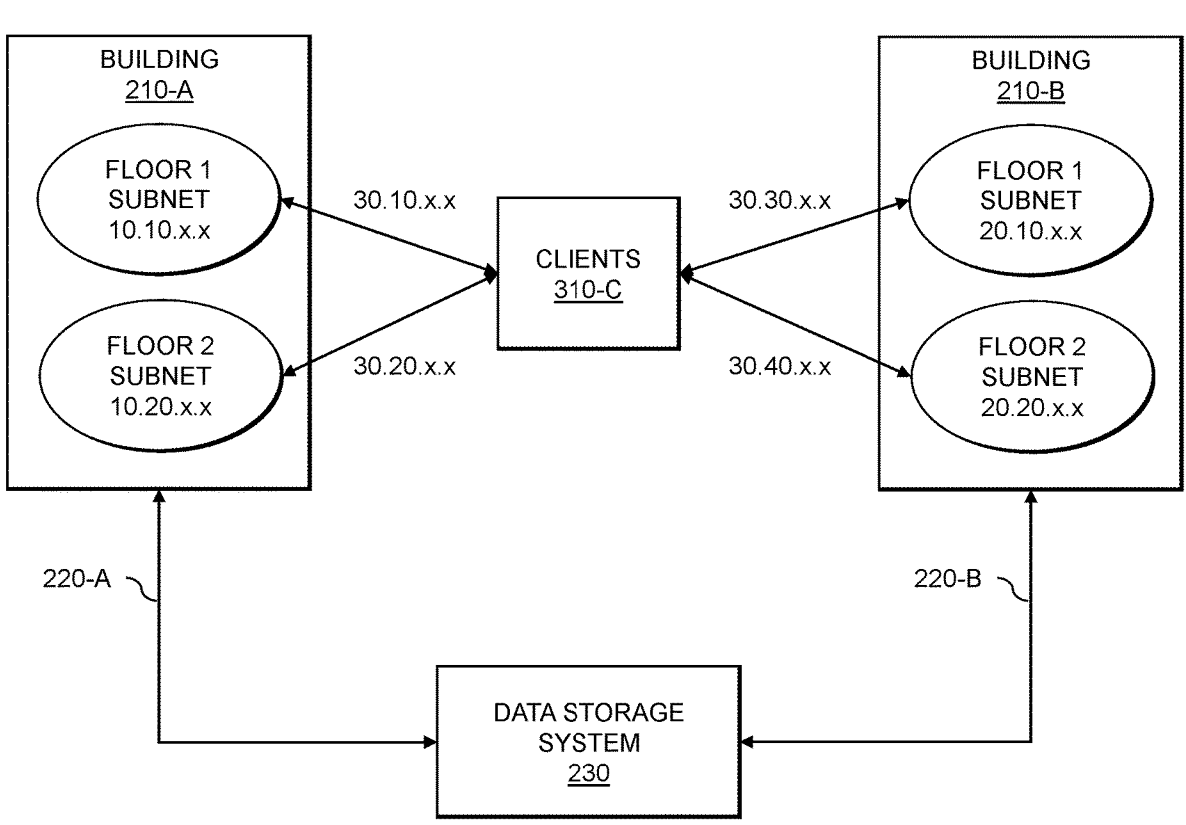
FIG. 3 shows another system configuration of multiple networks providing connectivity to a data storage system in an illustrative embodiment.

FIG. 3 shows another system 300, which includes all of the elements of system 200 as well as a group of clients 310-C which are in a third location (e.g., different than the building 210-A and the building 210-B). To achieve high-availability connection between the clients 310-C and the data storage system 230, the clients 310-C are connected using four endpoints for each client, one for each of the networks in the buildings 210-A and 210-B. Each of those endpoints constitutes its own IP network. Thus, as shown in FIG. 3, the clients 310-C have a first endpoint 30.10.x.x to the first network for the first floor of building 210-A with the subnet 10.10.x.x, a second endpoint 30.20.x.x to the second network for the second floor of building 210-A with the subnet 10.20.x.x. a third endpoint 30.30.x.x to the first network for the first floor of building 210-B with the subnet 20.10.x.x, and a fourth endpoint 30.40.x.x to the second network for the second floor of building 210-B with the subnet 20.20.x.x.

A configuration of the clients 310-C on the data storage system 230 will include all of the networks and IP endpoints as described above. However, it is evident that the networks are not fully independent, as they still depend on the underlying fabric (e.g., infrastructure 220-A and 220-B interconnecting the buildings 210-A and 210-B, respectively, to the data storage system 230). Consider, for example, the networks 30.10.x.x and 30.20.x.x. As these networks connect to the same building 210-A, if the building 210-A loses connectivity to the data storage system 230, then both the networks 30.10.xx and 30.20.x.x will fail. This "fail together" property of the networks 30.10.x.x and 30.20.x.x cannot be deduced from their IP configuration alone-more information is needed. By defining two different network sets to relate the underlying usage of buildings 210-A and 210-B, this can provide the data storage system 230 with sufficient information to perform resilient load balancing and zoning strategies.

As described above, the storage control system 150 of the storage node 140-1 implements the network set topology-aware management logic 160 which is configured to add network set indications to networks. A network set indication may encompass any desired attribute of co-dependency, and can be applied to various conditions (e.g., power supply, physical connectivity, virtualization, etc.). The network set topology-aware management logic 160 is configured to utilize the network set indications in various decisions which can be improved by understanding the dependencies among networks, such as resilience, load balancing, zoning, etc. The network set topology-aware management logic 160 thus allows for the storage node 140-1 (and, more generally, the data storage system 130), as well as various other applications, to perform smarter decisions for zoning, load balancing, etc. on the communications network 120.

In some embodiments, a particular network may be associated with multiple network sets. For example, network set indications may be attribute-specific such that a particular network may be associated with multiple, potentially distinct, network sets. In the context of the systems 200 and 300 of FIG. 3, for example, on each of the first and second floors of the buildings 210-A and 210-B, there may be different portions of such floors which are reliant on different power supplies. For example, a first part of the first floor of building 210-A may use a first power supply (e.g., network subnet 10.10.10.x), while a second part of the first floor of building 210-A may use a second power supply (e.g., network subnet 10.10.15.x). Thus, the network subnet 10.10.x.x for the first floor may be subdivided into two network sets associated with the first and second power supplies. Similarly, other attributes may be used to define different network sets. For example, some portions of a given network (e.g., IP subnet) may operate on or utilize a first virtual network, while another portion of the given network may operate on or utilize a second virtual network. Such virtual networks may be used as the attribute for defining network set indications for the different portions of the given network. Various other examples are possible.

While full mapping of a network fabric topology can provide more powerful insights into the communications network 120, in real-world scenarios such mapping is either: (1) automatic, which requires complex scanning that can sometimes be blocked for security reasons or (2) manual, where extensive information entering is required in an error-prone manner, and which can become obsolete with topology changes. By grouping networks into network sets, the network set topology-aware management logic 160 enables the introduction of powerful constraints on automatic zoning algorithms while also simplifying usability. The constraints that can be described by associating a network with a network set sufficiently cover various real-world deployments and the constraints involved in them, while keeping the user experience simple and reducing the risk for user error. Further, the network set topology-aware management logic 160 allows administrators to make more informed network upgrade decisions, by making sure that traffic is load balanced across networks from all nodes involved, thus avoiding or reducing network unavailability scenarios.

Conventional approaches may rely on topology-oblivious load balancing (e.g., such as NVMe load balancing approaches), which do not provide needed resiliency and performance. Other conventional approaches allow for zoning and load balancing based only on networks which, while powerful, lack the ability to address complex network topologies (e.g., Layer 3 (L3) or routing based on IP addresses) which is the case for many back-bone connectivity schemes. Still other conventional approaches include performing zoning and load balancing manually by a system administrator, which is error-prone, time consuming and does not allow for responses to changes in connectivity.

In some cases, metadata manager (MDM) based tracking is used to monitor the status of networks attached to a storage system. The technical solutions described herein do not consider or rely on tracking the status and health of a network in a full-mesh connectivity environment. In some embodiments, the technical solutions described herein provide approaches for connectivity planning and zoning where connectivity paths are constrained by scale. Further, the connectivity plans achieved by the technical solutions described herein do not depend on the health and status of any of the networks involved, but rather are planned to provide path resiliency in case a network involved is failing. Thus, the technical solutions described herein are relevant and useful for NVMe/TCP traffic load balancing, and extend network management to NVMe hosts and SDCs, for systems utilizing iSCSI protocols, file-based access protocols, object-based access protocols, etc. Further, the technical solutions described herein do not require automatic detection of network topology. Network sets may be defined automatically (or, in some cases, at least in part based on manual definition or specification) for imposing restrictions on load balancing, zoning, etc., including in cases where it is not possible to automatically detect network topology.

Figure 4:
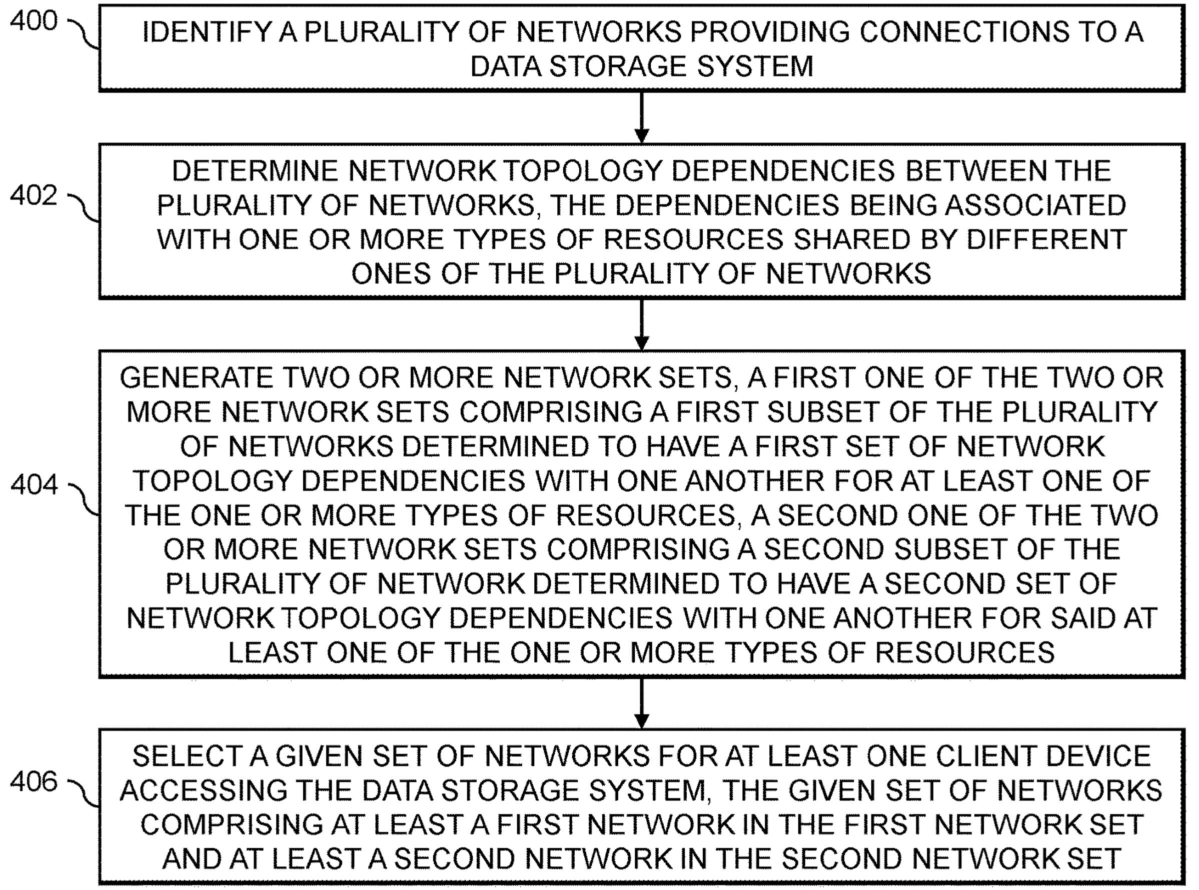
FIG. 4 is a flow diagram of an exemplary process for generation of network sets for a data storage system based on network topology dependencies for networks providing connections to the data storage system in an illustrative embodiment.

FIG. 4 is a flow diagram of a process for generation of network sets for a data storage system based on network topology dependencies for networks providing connections to the data storage system according to an exemplary embodiment of the disclosure. The process as shown in FIG. 4 includes steps 400 through 406. For purposes of illustration, the process flow of FIG. 4 will be discussed in the context of the storage control system 150 of FIG. 1.

At step 400, a plurality of networks providing connections to a data storage system (e.g., data storage system 130) are identified. The plurality of networks may comprise distinct IP subnets.

At step 402, network topology dependencies between the plurality of networks are determined. The dependencies are associated with one or more types of resources shared by different ones of the plurality of networks. A given one of the network topology dependencies may be associated with one or more underlying resources utilized for implementing the plurality of networks, such as physical infrastructure implementing the plurality of networks, virtualization infrastructure implementing the plurality of networks, power supplies powering the plurality of networks, etc.

At step 404, two or more network sets are generated. A first one of the two or more network sets comprises a first subset of the plurality of networks determined to have a first set of network topology dependencies with one another for at least one of the one or more types of resources. A second one of the two or more network sets comprises a second subset of the plurality of networks determined to have a second set of network topology dependencies with one another for said at least one of the one or more types of resources. Step 404 may include associating a first network set indicator with the first subset of the plurality of networks and associating a second network set indicator with the second subset of the plurality of networks. The first set of network topology dependencies for the first network set may indicate that the first subset of the plurality of networks have at least a threshold likelihood of failing together, and the second set of network topology dependencies for the second network may indicate that the second subset of the plurality of networks have at least the threshold likelihood of failing together.

In some embodiments, the first subset of the plurality of networks in the first network set are associated with a first physical location and the second subset of the plurality of networks in the second network set are associated with a second physical location, the second physical location being different than the first physical location. The first physical location may comprise a first building and the second physical location may comprise a second building, the second building being different than the first building. The first subset of the plurality of networks may be associated with different floors of the first building, and the second subset of the plurality of networks may be associated with different floors of the second building.

At step 406, a given set of networks is selected for at least one client device (e.g., at least one of the compute nodes 110) accessing the data storage system. The given set of networks comprises at least a first network in the first network set and at least a second network in the second network set. Step 406 may be based at least in part on a high availability requirement for said at least one client device, the high availability requirement specifying that the given set of networks should include networks from at least a threshold number of distinct ones of the two or more network sets. Step 406 may also or alternatively be based at least in part on a zoning requirement for said at least one client device, the zoning requirement specifying which of the two or more network sets that said at least one client device is permitted to utilize for accessing the data storage system. Step 406 may further or alternatively be based at least in part on a load balancing requirement for said at least one client device, the load balancing requirement specifying proportions of connections between said at least one client device and the data storage system which are permitted to utilize each of the two or more network sets.

The particular processing operations and other system functionality described above in conjunction with the flow diagram of FIG. 4 are presented by way of illustrative examples only, and should not be construed as limiting the scope of the disclosure in any way. Alternative embodiments can use other types of processing operations for implementing functionality for generation of network sets for a data storage system based on network topology dependencies for networks providing connections to the data storage system. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 4 can be implemented at least in part in the form of one or more software programs stored in memory and executed by a processor of a processing device such as a computer or server.

Figure 5:
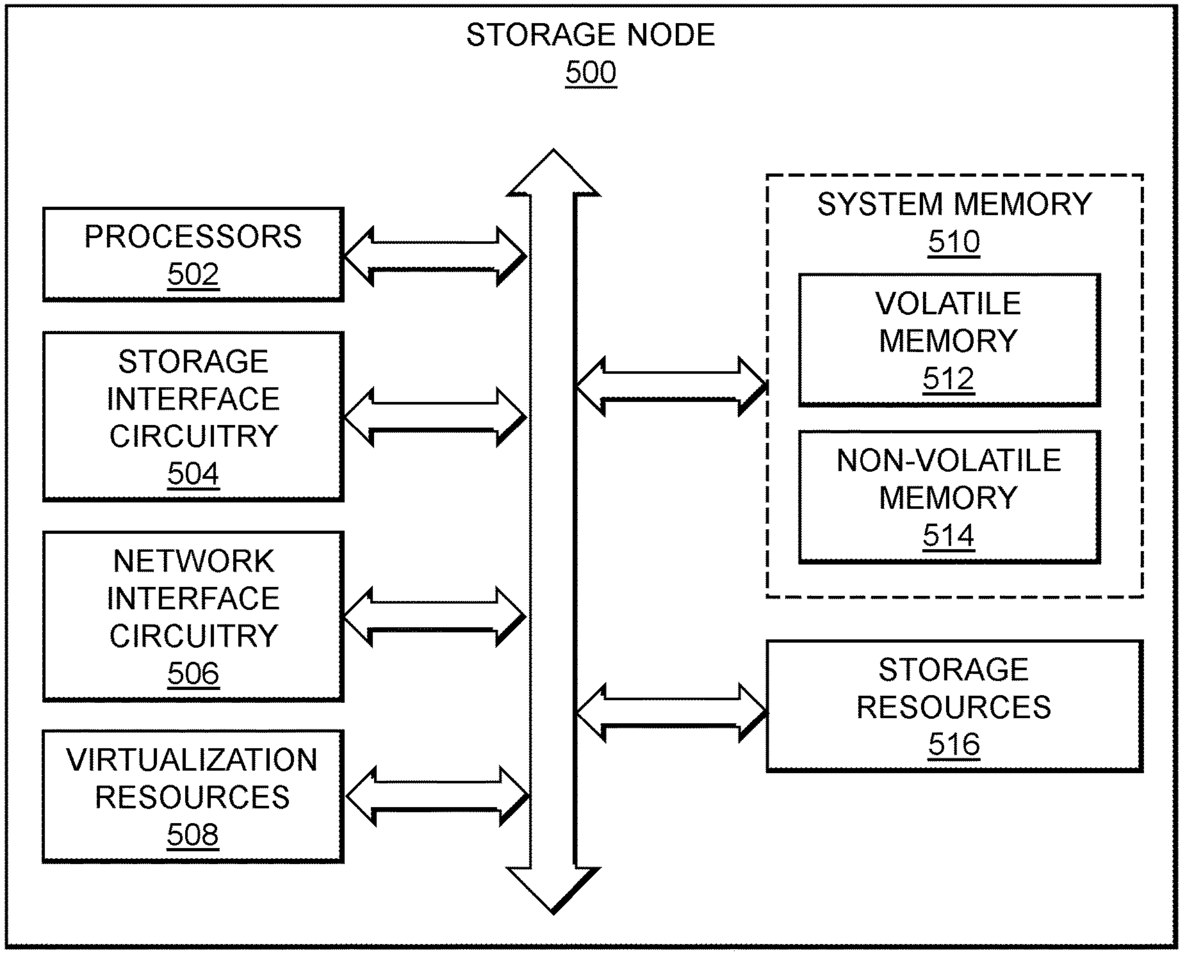
FIG. 5 schematically illustrates an example framework of a storage node for implementing a storage node of a storage system in illustrative embodiments.

FIG. 5 schematically illustrates a framework of a storage node 500 (e.g., one or more the compute nodes 110 and/or storage nodes 140 in the information processing system 100 of FIG. 1) which can be implemented for hosting a storage control system (e.g., the storage control system 150). The storage node 500 comprises processors 502, storage interface circuitry 504, network interface circuitry 506, virtualization resources 508, system memory 510, and storage resources 516. The system memory 510 comprises volatile memory 512 and non-volatile memory 514.

The processors 502 comprise one or more types of hardware processors that are configured to process program instructions and data to execute a native operating system (OS) and applications that run on the storage node 500. For example, the processors 502 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 504 enables the processors 502 to interface and communicate with the system memory 510, the storage resources 516, and other local storage and off-infrastructure storage media, using one or more standard communication and/or storage control protocols to read data from or write data to volatile and non-volatile memory/storage devices. Such protocols include, but are not limited to, non-volatile memory express (NVMe), peripheral component interconnect express (PCIe), Parallel ATA (PATA), Serial ATA (SATA), Serial Attached SCSI (SAS), Fibre Channel, etc. The network interface circuitry 506 enables the storage node 500 to interface and communicate with a network and other system components. The network interface circuitry 506 comprises network controllers such as network cards and resources (e.g., network interface controllers (NICs) including SmartNICs, RDMA-enabled NICs, etc., Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 508 can be instantiated to execute one or more services or functions which are hosted by the storage node 500. For example, the virtualization resources 508 can be configured to implement the various modules and functionalities of the storage control system 150 as discussed herein. In some embodiments, the virtualization resources 508 comprise virtual machines that are implemented using a hypervisor platform which executes on the storage node 500, wherein one or more virtual machines can be instantiated to execute functions of the storage node 500. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the storage node 500, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In other embodiments, the virtualization resources 508 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the storage node 500 as well as execute one or more of the various modules and functionalities of the storage control system 150 of FIG. 1 as discussed herein. In yet other embodiments, containers may be used in combination with other virtualization infrastructure such as virtual machines implemented using a hypervisor, such as where Docker containers or other types of LXCs are configured to run on virtual machines in a multi-tenant environment.

In some embodiments, the various components, systems, and modules of the storage control system 150 comprise program code that is loaded into the system memory 510 (e.g., volatile memory 512), and executed by the processors 502 to perform respective functions as described herein. In this regard, the system memory 510, the storage resources 516, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 510 comprises various types of memory such as volatile RAM, NVRAM, or other types of memory, in any combination. The volatile memory 512 may be a dynamic random-access memory (DRAM) (e.g., DRAM DIMM (Dual In-line Memory Module)), or other forms of volatile RAM. The non-volatile memory 514 may comprise one or more of NAND Flash storage devices, SSD devices, or other types of next generation non-volatile memory (NGNVM) devices. The system memory 510 can be implemented using a hierarchical memory tier structure wherein the volatile memory 512 is configured as the highest-level memory tier, and the non-volatile memory 514 (and other additional non-volatile memory devices which comprise storage-class memory) is configured as a lower level memory tier which is utilized as a high-speed load/store non-volatile memory device on a processor memory bus (e.g., data is accessed with loads and stores, instead of with I/O reads and writes). The term "memory" or "system memory" as used herein refers to volatile and/or non-volatile memory which is utilized to store application program instructions that are read and processed by the processors 502 to execute a native operating system and one or more applications or processes hosted by the storage node 500, and to temporarily store data that is utilized and/or generated by the native OS and application programs and processes running on the storage node 500. The storage resources 516 can include one or more HDDs, SSD storage devices, etc.

It should again be emphasized that the above-described embodiments are presented for purposes of illustration only. Many variations and other alternative embodiments may be used. For example, the disclosed techniques are applicable to a wide variety of other types of information processing systems, storage systems, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:

at least one processing device comprising a processor coupled to a memory;

the at least one processing device being configured:

to identify a plurality of networks providing connections to a data storage system;

to determine network topology dependencies between the plurality of networks, the dependencies being associated with one or more types of resources shared by different ones of the plurality of networks;

to generate two or more network sets, a first one of the two or more network sets comprising a first subset of the plurality of networks determined to have a first set of network topology dependencies with one another for at least one of the one or more types of resources, a second one of the two or more network sets comprising a second subset of the plurality of networks determined to have a second set of network topology dependencies with one another for said at least one of the one or more types of resources; and to select a given set of networks for at least one client device accessing the data storage system, the given set of networks comprising at least a first network in the first network set and at least a second network in the second network set;

wherein the first subset of the plurality of networks are implemented using a first set of resources of said at least one of the one or more types of resources, and the first set of network topology dependencies indicates that the first set of resources implementing the first subset of the plurality of networks have at least a first threshold likelihood of failing together; and wherein the second subset of the plurality of networks are implemented using a second set of resources of said at least one of the one or more types of resources, and the second set of network topology dependencies indicates that the second set of resources implementing the second subset of the plurality of networks have at least a second threshold likelihood of failing together.

2. The apparatus of claim 1 wherein the plurality of networks comprise distinct Internet Protocol (IP) subnets.

3. The apparatus of claim 1 wherein a given one of the network topology dependencies is associated with one or more underlying resources utilized for implementing the plurality of networks.

4. The apparatus of claim 1 wherein the first and second sets of resources comprise respective different physical infrastructure implementing the first and second subsets of the plurality of networks.

5. The apparatus of claim 1 wherein the first and second sets of resources comprise respective different virtualization infrastructure implementing the first and second subsets of the plurality of networks.

6. The apparatus of claim 1 wherein the first and second sets of resources comprise respective different power supplies powering the first and second subsets of the plurality of networks.

7. The apparatus of claim 1 wherein the first subset of the plurality of networks in the first network set are associated with a first physical location and the second subset of the plurality of networks in the second network set are associated with a second physical location, the second physical location being different than the first physical location.

8. The apparatus of claim 7 wherein the first physical location comprises a first building and the second physical location comprises a second building, the second building being different than the first building.

9. The apparatus of claim 8 wherein the first subset of the plurality of networks are associated with different floors of the first building, and wherein the second subset of the plurality of networks are associated with different floors of the second building.

10. The apparatus of claim 1 wherein generating the two or more network sets comprises associating a first network set indicator with the first subset of the plurality of networks and associating a second network set indicator with the second subset of the plurality of networks.

11. The apparatus of claim 1 wherein selecting the given set of networks for said at least one client device accessing the data storage system is based at least in part on a high availability requirement for said at least one client device, the high availability requirement specifying that the given set of networks should include networks from at least a threshold number of distinct ones of the two or more network sets.

12. The apparatus of claim 1 wherein selecting the given set of networks for said at least one client device accessing the data storage system is based at least in part on a zoning requirement for said at least one client device, the zoning requirement specifying which of the two or more network sets that said at least one client device is permitted to utilize for accessing the data storage system.

13. The apparatus of claim 1 wherein selecting the given set of networks for said at least one client device accessing the data storage system is based at least in part on a load balancing requirement for said at least one client device, the load balancing requirement specifying proportions of connections between said at least one client device and the data storage system which are permitted to utilize each of the two or more network sets.

14. A computer program product comprising a non-transitory processor-readable storage medium having stored therein program code of one or more software programs, wherein the program code when executed by at least one processing device causes the at least one processing device:

to identify a plurality of networks providing connections to a data storage system;

to determine network topology dependencies between the plurality of networks, the dependencies being associated with one or more types of resources shared by different ones of the plurality of networks;

to generate two or more network sets, a first one of the two or more network sets comprising a first subset of the plurality of networks determined to have a first set of network topology dependencies with one another for at least one of the one or more types of resources, a second one of the two or more network sets comprising a second subset of the plurality of networks determined to have a second set of network topology dependencies with one another for said at least one of the one or more types of resources; and to select a given set of networks for at least one client device accessing the data storage system, the given set of networks comprising at least a first network in the first network set and at least a second network in the second network set;

wherein the first subset of the plurality of networks are implemented using a first set of resources of said at least one of the one or more types of resources, and the first set of network topology dependencies indicates that the first set of resources implementing the first subset of the plurality of networks have at least a first threshold likelihood of failing together; and wherein the second subset of the plurality of networks are implemented using a second set of resources of said at least one of the one or more types of resources, and the second set of network topology dependencies indicates that the second set of resources implementing the second subset of the plurality of networks have at least a second threshold likelihood of failing together.

15. The computer program product of claim 14 wherein the plurality of networks comprise distinct Internet Protocol (IP) subnets.

16. A method comprising:

identifying a plurality of networks providing connections to a data storage system;

determining network topology dependencies between the plurality of networks, the dependencies being associated with one or more types of resources shared by different ones of the plurality of networks;

generating two or more network sets, a first one of the two or more network sets comprising a first subset of the plurality of networks determined to have a first set of network topology dependencies with one another for at least one of the one or more types of resources, a second one of the two or more network sets comprising a second subset of the plurality of networks determined to have a second set of network topology dependencies with one another for said at least one of the one or more types of resources; and selecting a given set of networks for at least one client device accessing the data storage system, the given set of networks comprising at least a first network in the first network set and at least a second network in the second network set;

wherein the first subset of the plurality of networks are implemented using a first set of resources of said at least one of the one or more types of resources, and the first set of network topology dependencies indicates that the first set of resources implementing the first subset of the plurality of networks have at least a first threshold likelihood of failing together;

wherein the second subset of the plurality of networks are implemented using a second set of resources of said at least one of the one or more types of resources, and the second set of network topology dependencies indicates that the second set of resources implementing the second subset of the plurality of networks have at least a second threshold likelihood of failing together; and wherein the method is performed by at least one processing device comprising a processor coupled to a memory.

17. The method of claim 16 wherein the plurality of networks comprise distinct Internet Protocol (IP) subnets.

18. The method of claim 16 wherein the first and second sets of resources comprise respective different physical infrastructure implementing the first and second subsets of the plurality of networks.

19. The method of claim 16 wherein the first and second sets of resources comprise respective different virtualization infrastructure implementing the first and second subsets of the plurality of networks.

20. The method of claim 16 wherein the first and second sets of resources comprise respective different power supplies powering the first and second subsets of the plurality of networks.

* * * * *